United States Patent [19]

Johnson, Jr. et al.

[11] 4,301,020

[45] Nov. 17, 1981

[54] PROCESS OF SLURRYING AND SPRAY DRYING CERAMIC OXIDES WITH POLYETHYLENEIMINE DISPERSANTS

[75] Inventors: David W. Johnson, Jr., Pluckemin; Eva M. Vogel, Berkeley Heights, both of N.J.

[73] Assignee: Bell Telephone Laboratories, Incorporated, Murray Hill, N.J.

[21] Appl. No.: 232,204

[22] Filed: Feb. 6, 1981

Related U.S. Application Data

[62] Division of Ser. No. 929,930, Aug. 1, 1978, Pat. No. 4,267,065.

[51] Int. Cl.³ .............................................. C04B 35/38
[52] U.S. Cl. .......................... 252/62.62; 106/308 N; 106/308 F; 106/308 Q; 106/288 B; 501/1; 264/13; 423/594
[58] Field of Search .......... 106/308 N, 308 Q, 308 F, 106/296, 304, 309, 39.5; 252/62.62; 264/13, 6; 423/594

[56] References Cited

U.S. PATENT DOCUMENTS

| | | | |
|---|---|---|---|
| 3,455,718 | 7/1969 | Dithmar et al. | 106/308 N X |
| 3,597,253 | 8/1971 | Beschke et al. | 106/308 N X |
| 3,615,811 | 10/1971 | Barrett | 106/306 |
| 3,663,284 | 5/1972 | Stancioff et al. | 106/308 N X |
| 4,144,083 | 3/1979 | Abercrombie | 106/308 Q X |
| 4,226,843 | 10/1980 | Watanabe et al. | 423/594 |
| 4,267,065 | 5/1981 | Johnson et al. | 252/62.62 |

FOREIGN PATENT DOCUMENTS 1282307  7/1972  United Kingdom ............ 252/62.62

Primary Examiner—Helen M. McCarthy
Attorney, Agent, or Firm—Richard D. Laumann

[57] ABSTRACT

Many ceramics are produced with a processing sequence that includes spray drying or ball milling a slurry. To produce ceramics with the best properties and to facilitate ball milling or spray drying, a dispersant is normally added to the ceramic slurry. Ammonium citrate and polyethylenimine have been found to produce ceramic slurries with the desired characteristics. The dispersants appear especially well suited for use with ferrite slurries.

6 Claims, No Drawings

PROCESS OF SLURRYING AND SPRAY DRYING CERAMIC OXIDES WITH POLYETHYLENEIMINE DISPERSANTS

This application is a division of application Ser. No. 929,930, filed Aug. 1, 1978, now U.S. Pat. No. 4,267,065.

BACKGROUND OF THE INVENTION

1. Field of the Invention

This invention relates generally to ceramic processing and more specifically it relates to ceramic processing using dispersants that improve the rheological properties of ceramic slurries.

2. Description of the Prior Art

Much of the commercial ceramic, including ferrite production, uses a processing sequence that compacts dry granular ceramic powder. Although several techniques may be used to obtain appropriately granulated powder, the principal commercial technique used today spray dries a ceramic slurry to produce generally spherical agglomerated grains of uniform and controllable size which lead to the better flow and die filling properties necessary for ceramics of uniform density and microstructure.

The slurry that is spray dried is usually prepared by ball milling a solution, typically aqueous, containing the ceramic materials. To increase the dispersion of the solids and thus maximize the solids concentration within the slurry, a dispersant is normally added to the slurry to decrease the slurry viscosity without the necessity of adding excessive water. The addition of excessive water to the slurry to lower the viscosity is not desirable for several reasons. Spray drying is an energy intensive process and production costs necessarily increase. Excessive water also produces lower density granules and higher losses because of the presence of fine agglomerates. The dispersant also improves packing when the ceramic is pressed. Some ceramics are processed without spray drying but a dispersant is added to the slurry to facilitate ball milling or other subsequent processing.

A good dispersant must satisfy several criteria. It should minimize the amount of water required to obtain the desired viscosity and be compatible with other additives and processing steps. Since an organic binder is often used to produce the strength and plasticizing properties needed for dry processing before sintering, the dispersant must be compatible with the binder. The dispersant is not a desirable addition to the final ceramic composition and it should be easily removable at some point in the processing sequence.

A commonly used dispersant is gum arabic which is a natural product collected from trees belonging to the genus acacia. Species of this genus have an extensive geographical range but trees growing in the Sudan and Senegal generally produce the best gum arabic. Gum arabic has generally good dispersing properties but unfortunately also has several undesirable properties. In addition to possibly uncertain supply, its properties are not easily reproducible. Gum arabic contains relatively large quantities of inorganic materials, such as silicon, sodium and calcium, some of which can adversely alter the properties of the ceramic composition.

SUMMARY OF THE INVENTION

In a method of processing ceramics that forms a slurry of ceramic material and a dispersant, slurries with good and reproducible properties are formed using ammonium citrate and polyethylenimine as dispersants. The slurry is typically spray dried after ball milling although it is contemplated that the dispersants may be used to improve the slurry characteristics for ball milling in ceramic processing sequences that do not include a spray drying step. The dispersants appear especially well suited for use with ferrite slurries.

DETAILED DESCRIPTION

Typically, very fine particles of the oxides or carbonates of the ceramic cations are mixed, either wet or dry, and then calcined. The calcined material should be of reactive particle size, i.e., have a large surface area for good sintering, and be agglomerated into granules of uniform and controllable size prior to pressing. Such granules are generally obtained by loading the calcined powder into ball mills and adding a liquid, which is usually water although methanol may be used, and a dispersant to form a slurry. Ball milling then proceeds in conventional and well-known manner and is typically followed by spray drying of the slurry. After pressing the spray dried material, the ceramic is heated to burn out the dispersant. It is desirable to burn out the dispersant in a manner which avoids the buildup of excessive gas in the pressed material. Ideally, burnout takes place over a range of temperatures. For both polyethylenimine and ammonium citrate, burnout is completed below 600 degrees C. Details as to useful time, temperature and pressure range are easily ascertained by workers in the field.

The precise pH of the slurry is not generally critical but should be approximately 7. If the pH is less than 4 or greater than 10, the total electrolyte concentration may impede the dispersing action. The slurry may be conveniently formed at room temperature. Spray drying is performed in conventional and well-known manner such as described in *The Western Electric Engineer* 7, pp. 2-10, 1963. Typical entrance and exit temperatures are 255 and 145 degrees C, respectively.

Polyethyleneimine and ammonium citrate may be either purchased commercially or prepared with well-known techniques. Preparation and properties of polyethylenimine are described in Ref. Zh. Khim. 1975; P. A. Gembitskii, V. A. Andvonov and D. S. Zhuk. Ammonium citrate may be prepared by reacting appropriate amounts of citric acid and ammonium hydroxide.

Univeral standards for measuring the properties of dispersants and classifying them do not exist. It has been found that viscosity provides a satisfactory basis for characterizing slurries. Slurries with satisfactory properties are obtained when the viscosity, $\eta$, is less than approximately 400 cp. If the viscosity is greater than approximately 500 cp, the slurry is not sufficiently fluid to separate easily from the milling media used in the ball milling process and pumping the slurry for spray drying becomes difficult. There is no lower limit to the viscosity other than that imposed by the desire to minimize the amount of water used.

The dispersant, either polyethylenimine or ammonium citrate, concentration in the slurry depends upon both the desired viscosity and the amount of water present. The lower limit on the dispersant concentration is determined by the upper limit on the allowable viscosity and water present. As both the permitted viscosity and amount of water increase, the amount of dispersant needed decreases. The upper limit on the dispersant concentration is determined by both its decreasing effectiveness with increasing concentration after the minimum viscosity point has been passed and the processing complications necessarily introduced by the necessity of ultimately removing the dispersant.

For slurries with constant amounts of water and particle size, it has been found that the viscosity decreases rapidly as the dispersant concentration increases from zero, reaches minimum and then slowly increases. The optimum dispersant concentration occurs slightly above the assumed minimum viscosity point to avoid increases in viscosity that might result if small variations in materials shift the minimum viscosity point. For slurries with approximately 75 weight percent, i.e., between approximately 65 and 80 percent, solids having an equivalent spherical diameter of 0.7 $\mu$m or a surface area of 1.62 $m^2$/gm, useful values are 0.25 to 1.00 weight percent of polyethylenimine and 0.02 to 0.8 weight percent of ammonium citrate. Minimum useful values are 0.25 weight percent of polyethylenimine and 0.02 weight percent ammonium citrate. Mixtures of the two dispersants may also be used. The weight percents given for the dispersant are calculated by dividing the dispersant weight by the solids weight while the weight percent given for the solids is calculated by dividing the solids weight by the slurry weight. As the weight percent of solids increases, the dispersant concentration must increase. Weight percents of solids are typically between 70 percent and 80 percent.

The precise mechanism or mechanisms by which the dispersants act are hypothesized to be as follows. A combination of steric hindrance and electrostatic replulsion is believed to be the effective dispersing mechanism for polyethylenimine. Basically, the molecules of the dispersant are adsorbed on the particle surfaces and for steric hindrance, the relatively large molecular size prevents the ceramic particles from approaching each other too closely. The polyethylenimines should have an average molecular weight of approximately 50,000 although molecular weights higher than 20,000 may be used. For electrostatic repulsion, ions of the dispersant are adsorbed on the surface layer of the ceramic particles. The resulting electrostatic force keeps the ceramic particles apart. This is believed to be the effective mechanism for ammonium citrate.

The invention will be illustrated by reference to specific examples showing the use of both polyethylenimine and ammonium citrate as dispersants.

EXAMPLE 1

Mn-Zn-Fe oxides having a surface area of 1.62 $m^2$/gm and an Mn-Zn-Fe atom ratio of 18-14-68 were formed into a slurry having a solids content of 74 weight percent. Polyethylenimine having a concentration of 0.25 weight percent yielded a slurry having satisfactory viscosity.

EXAMPLE 2

Mn-Zn-Fe oxides having a surface area of 1.62 $m^2$/gm and an Mn-Zn-Fe atom ratio of 18-14-68 were formed into a slurry having a solids content of 74 weight percent. Polyethylenimine having a concentration of 0.50 weight percent yielded a slurry having satisfactory viscosity.

EXAMPLE 3

Mn-Zn-Fe oxides having a surface area of 1.62 $m^2$/gm and an Mn-Zn-Fe atom ratio of 18-14-68 were formed into a slurry having a solids content of 74 weight percent. Polyethylenimine having a concentration of 0.75 weight percent yielded a slurry having satisfactory viscosity.

EXAMPLE 4

Mn-Zn-Fe oxides having a surface area of 1.62 $m^2$/gm and an Mn-Zn-Fe atom ratio of 18-14-68 were formed into a slurry having a solids content of 74 weight percent. Polyethylenimine having a concentration of 1.00 weight percent yielded a slurry having satisfactory viscosity.

EXAMPLE 5

Mn-Zn-Fe oxides having a surface area of 1.62 $m^2$/gm and an Mn-Zn-Fe atom ratio of 18-14-68 were formed into a slurry having a solids content of 74 weight percent. Polyethylenimine having a concentration of 2.00 weight percent yielded a slurry having satisfactory viscosity.

EXAMPLE 6

Mn-Zn-Fe oxides having a surface area of 1.62 $m^2$/gm and an Mn-Zn-Fe atom ratio of 18-14-68 were formed into a slurry having a solids content of 80 weight percent. Polyethylenimine having a concentration of 0.50 weight percent yielded a slurry having satisfactory viscosity.

EXAMPLE 7

Mn-Zn-Fe oxides having a surface area of 1.62 $m^2$/gm and an Mn-Zn-Fe atom ratio of 18-14-68 were formed into a slurry having a solids content of 74 weight percent. Ammonium citrate having a concentration of 0.02 weight percent yielded a slurry having satisfactory viscosity.

EXAMPLE 8

Mn-Zn-Fe oxides having a surface area of 1.62 $m^2$/gm and an Mn-Zn-Fe atom ratio of 18-14-68 were formed into a slurry having a solids content of 74 weight percent. Ammonium citrate having a concentration of 0.05 weight percent yielded a slurry having satisfactory viscosity.

EXAMPLE 9

Mn-Zn-Fe oxides having a surface area of 1.62 $m^2$/gm and an Mn-Zn-Fe atom ratio of 18-14-68 were formed into a slurry having a solids content of 74 weight percent. Ammonium citrate having a concentration of 0.1 weight percent yielded a slurry having satisfactory viscosity.

EXAMPLE 10

Mn-Zn-Fe oxides having a surface area of 1.62 $m^2$/gm and an Mn-Zn-Fe atom ratio of 18-14-68 were formed into a slurry having a solids content of 74 weight percent. Ammonium citrate having a concentration of 0.2 weight percent yielded a slurry having satisfactory viscosity.

EXAMPLE 11

Mn-Zn-Fe oxides having a surface area of 1.62 $m^2$/gm and an Mn-Zn-Fe atom ratio of 18-14-68 were formed into a slurry having a solids content of 74 weight percent. Ammonium citrate having a concentration of 0.80 weight percent yielded a slurry having satisfactory viscosity.

EXAMPLE 12

Mn-Co-Ni oxides having a surface area of 3.3 $m^2/gm$ and an Mn-Co-Ni atom ratio of 56-30-14 were formed into a slurry having a solids content of 74 weight percent. Ammonium citrate having a concentration of 0.2 weight percent yielded a slurry having satisfactory viscosity.

EXAMPLE 13

Mn-Co-Ni oxides having a surface area of 3.3 $m^2/gm$ and an Mn-Co-Ni atom ratio of 56-30-14 were formed into a slurry having a solids content of 74 weight percent. Polyethylenimine having a concentration of 0.75 weight percent yielded a slurry having satisfactory viscosity.

EXAMPLE 14

Mn-Zn-Fe oxides having a surface area of 1.94 $m^2/gm$ and an Mn-Zn-Fe atom ratio of 17-15-68 were formed into a slurry having a solids content of 74 weight percent. A 0.75 weight percent concentration of ammonium citrate yielded a slurry having satisfactory viscosity.

EXAMPLE 15

Mn-Zn-Fe oxides having a surface area of 1.94 $m^2/gm$ and an Mn-Zn-Fe atom ratio of 17-15-68 were formed into a slurry having a solids content of 74 weight percent. A 0.2 weight percent concentration of polyethylenimine yielded a slurry having satisfactory viscosity.

EXAMPLE 16

Mn-Zn-Fe-Ca oxides having a surface area of 1.94 $m^2/gm$ and an Mn-Zn-Fe-Ca atom ratio of 17-15-68-0.2 were formed into a slurry having a solids content of 74 weight percent. A 0.2 weight percent concentration of ammonium citrate yielded a slurry having satisfactory viscosity.

EXAMPLE 17

Mn-Zn-Fe-Ca oxides having a surface area of 1.94 $m^2/gm$ and an Mn-Zn-Fe-Ca atom ratio of 17-15-68-0.2 were formed into a slurry having a solids content of 74 weight percent. A 0.75 weight percent concentration of polyethylenimine yielded a slurry having satisfactory viscosity.

EXAMPLE 18

Ni-Zn-Co-Fe-Ca oxides having a surface area of 3.1 $m^2/gm$ and a Ni-Zn-Co-Fe-Ca atom ratio of 16-11-0.6-72-0.3 were formed into a slurry having a solids content of 74 weight percent. A 0.2 weight percent concentration of ammonium citrate yielded a slurry having satisfactory viscosity.

EXAMPLE 19

Ni-Zn-Co-Fe-Ca oxides having a surface area of 3.1 $m^2/gm$ and a Ni-Zn-Co-Fe-Ca atom ratio of 16-11-0.6-72-0.3 were formed into a slurry having a solids content of 74 weight percent. A 0.2 weight percent concentration of polyethylenimine yielded a slurry having satisfactory viscosity.

EXAMPLE 20

Mn-Zn-Fe-Ca-Ti oxides having a surface area of 1.51 $m^2/gm$ and a Mn-Zn-Fe-Ca-Ti atom ratio of 18-14-66-0.1-2 were formed into a slurry having a solids content of 71 weight percent. A 0.2 weight percent concentration of ammonium citrate yielded a slurry having satisfactory viscosity.

EXAMPLE 21

Mn-Zn-Fe-Ca-Ti oxides having a surface area of 1.51 $m^2/gm$ and an Mn-Zn-Fe-Ca-Ti atom ratio of 18-14-66-0.1-2 were formed into a slurry having a solids content of 71 weight percent. A 0.75 weight percent concentration of polyethylenimine yielded a slurry having satisfactory viscosity.

Within a given system the atom ratios may be varied from those given in the examples without altering the range of useful dispersant concentrations.

We claim:

1. A method of processing ceramics which comprises forming a slurry consisting of ceramic material and a dispersant; said ceramic material forming between 65 percent and 80 percent, by weight, of said material and being a mixture of metal oxides, and spray drying said slurry;

characterized in that said dispersant consists essentially of at least one member selected from the group consisting of polyethylenimine and mixtures of polyethylenimine and ammonium citrate.

2. A method as recited in claim 1 in which said slurry has a solids content of approximately 75 percent.

3. A method as recited in claim 2 in which said ceramic material is a mixture of oxides suitable for forming a ferrite.

4. A method as recited in claim 3 in which said ferrite is a MnZn ferrite.

5. A method as recited in claim 3 in which said dispersant is polyethylenimine, said dispersant having a concentration greater than 0.25 weight percent.

6. A method as recited in claim 5 in which said concentration is between 0.75 and 1.00 weight percent.

* * * * *